United States Patent
Jackson et al.

(10) Patent No.: US 6,794,453 B2
(45) Date of Patent: Sep. 21, 2004

(54) CROSSLINKED, PREDOMINANTLY POLYPROPYLENE-BASED COMPOSITIONS

(75) Inventors: Peter Jackson, Toronto (CA); Robert Edward Steele, Richmond Hill (CA); Amarjit Tathgur, Brampton (CA); Marcus P. Heydrich, Mississauga (CA); Dilip K. Tailor, Brampton (CA)

(73) Assignee: ShawCor Ltd., Ontario (CA)

( * ) Notice: Subject to any disclaimer, the term of this patent is extended or adjusted under 35 U.S.C. 154(b) by 24 days.

(21) Appl. No.: 10/216,644

(22) Filed: Aug. 12, 2002

(65) Prior Publication Data

US 2003/0050401 A1 Mar. 13, 2003

Related U.S. Application Data

(63) Continuation-in-part of application No. 09/705,777, filed on Nov. 6, 2000, now Pat. No. 6,455,637.

(51) Int. Cl.⁷ .................. C08L 23/00; C08L 23/04; C08L 27/10; C08L 43/00; C08L 45/00
(52) U.S. Cl. .............. 525/209; 525/211; 525/217; 525/221; 525/222; 525/231; 525/232; 525/240; 525/241
(58) Field of Search ................. 525/209, 211, 525/217, 221, 222, 231, 232, 240, 241

(56) References Cited

U.S. PATENT DOCUMENTS

| | | |
|---|---|---|
| 3,646,155 A | 2/1972 | Scott |
| 4,189,392 A | 2/1980 | Penneck et al. |
| 4,329,536 A | 5/1982 | Sato et al. |
| 4,413,066 A | 11/1983 | Isaka et al. |
| 4,464,425 A | 8/1984 | Voigt et al. |
| 4,558,094 A | 12/1985 | Deguchi et al. |
| 4,618,654 A | 10/1986 | Schmidtchen et al. |
| 4,702,868 A | 10/1987 | Pontiff et al. |
| 4,870,111 A | 9/1989 | Donuiff et al. |
| 4,978,436 A | 12/1990 | Kelly |
| 5,026,736 A | 6/1991 | Pontiff |
| 5,112,919 A | 5/1992 | Furrer et al. |
| 5,169,900 A | 12/1992 | Gudelis |
| 5,246,783 A | 9/1993 | Spenadel et al. |
| 5,461,110 A | 10/1995 | Arthurs et al. |
| 5,589,519 A | 12/1996 | Knaus |
| 5,604,033 A | 2/1997 | Arthurs et al. |
| 5,605,937 A | 2/1997 | Knaus |
| 5,741,858 A | 4/1998 | Brann et al. |
| 5,756,582 A | 5/1998 | Mori |
| 5,763,498 A | 6/1998 | Knaus |
| 5,859,076 A | 1/1999 | Kozma et al. |
| 5,883,144 A | 3/1999 | Bambara et al. |
| 5,883,145 A | 3/1999 | Hurley et al. |
| 5,929,129 A | 7/1999 | Feichtinger |
| 5,932,659 A | 8/1999 | Bambara et al. |
| 5,994,474 A | 11/1999 | Wey et al. |
| 6,004,647 A | 12/1999 | Bambara et al. |
| 6,455,637 B1 * | 9/2002 | Jackson et al. .......... 525/191 |

FOREIGN PATENT DOCUMENTS

| | | |
|---|---|---|
| GB | 2 093 760 | 9/1982 |
| WO | WO98/23687 | 6/1998 |

* cited by examiner

*Primary Examiner*—Nathan M. Nutter
(74) *Attorney, Agent, or Firm*—Shlesinger, Arkwright & Garvey LLP

(57) ABSTRACT

A crosslinked, predominantly polypropylene-based article comprises a silane-modified ethylene-based polyolefin, at least 50 percent by weight of a non silane-modified polypropylene, and a silane condensation catalyst. The article is moisture crosslinked to a sufficient degree that it possesses thermoset properties such that, when the article is heated to a temperature above the crystalline melting point of the non silane-modified polypropylene, it is softened but does not become liquid. The article preferably comprises a heat-shrinkable sleeve for a high-temperature transmission pipeline.

48 Claims, No Drawings

CROSSLINKED, PREDOMINANTLY POLYPROPYLENE-BASED COMPOSITIONS

REFERENCE TO RELATED APPLICATION

This application is a continuation-in-part application of U.S. patent application Ser. No. 09/705,777, filed on Nov. 6, 2000, now U.S. Pat. No. 6,455,637.

FIELD OF THE INVENTION

The present invention relates to polymeric compositions and their uses, and more particularly to predominantly polypropylene-based, crosslinked compositions and articles suitable for use in a range of applications, including coating or insulating materials.

BACKGROUND OF THE INVENTION

Polypropylenes are ideally suited to the preparation of coatings and insulations designed for use at operating temperatures in excess of those that can be withstood by other polyolefins, for example, polyethylene, which exhibit lower softening and melting temperatures. Polyethylenes have a maximum melting point, as measured by differential scanning calorimetry (DSC), of about 135° C., whereas polypropylenes can have melting points as high as 175° C.

Other attractive features of polypropylenes are their high rigidity and toughness, low cost and relatively low density. Applications for these coatings and insulations would include polymeric insulation for electrical wires and cables, and heat-shrinkable protective sleeves for high-temperature transmission pipelines, or applications requiring greater toughness and rigidity than is afforded by polyethylene-based systems. For example, heat-shrinkable sleeves used for the corrosion protection of high temperature pipeline joints are required to maintain dimensional stability and integrity at the operating temperature of the pipeline. Hence it is necessary to use a material, such as polypropylene, with a softening temperature or melting point high enough to prevent creeping or sagging of the sleeve from the pipe at the continuous operating temperature of the pipeline.

In order to maximise heat-resistance and physical properties, it is necessary to impart some thermoset characteristic to the material. This is done by crosslinking the polymer to some required degree. Crosslinking is also necessary for the production of heat-shrinkable articles to impart controlled shrinkage characteristics.

Polymers in which the predominant chain units comprise an alpha olefin, such as polypropylenes, are known to preferentially depolymerise when exposed to free radicals required to effect crosslinking. Hence, unlike polyolefins such as polyethylenes and copolymers of polyethylene, it is not possible to crosslink polypropylene-based materials to satisfactory levels, as is required, for example, in the production of wire and cable insulations, and heat-shrinkable articles, such as tubing, sheet, and moulded shapes, by using standard free-radical methods of crosslinking, such as electron beam irradiation or peroxide initiated crosslinking.

Alternate methods for crosslinking polyolefins are known. One such method comprises grafting a vinyl silane onto an olefin homopolymer or copolymer, followed by catalyzed hydrolysis and condensation of the silane groups. This is described in U.S. Pat. No. 3,646,155 (Scott), issued on Feb. 29, 1972. Alternatively, the vinyl silane may be copolymerised directly with olefin monomers as described in U.S. Pat. No. 4,413,066 (Isaka et al.), issued on Nov. 1, 1983. Since these methods require a free-radical generator to initiate the silane grafting or copolymerisation reaction, polypropylene is also unsuited to these methods of crosslinking.

Although the prior art contains examples of polypropylene-containing compositions having some crosslinking, none of these compositions is a predominantly polypropylene-based, crosslinked composition having the desirable properties of polypropylene.

One example of a prior art composition is disclosed in International Publication No. WO98/23687 (Laughner et al.), published on Jun. 4, 1998. This publication relates to the production of thermoplastic elastomers (TPE's), which comprise a thermoplastic matrix substantially free of crosslinking and a discontinuous elastomer phase in the form of domains dispersed throughout the matrix. According to Laughner et al., the thermoplastic phase may comprise polypropylene and the elastomer domains comprising the discontinuous phase are grafted with silane and subsequently crosslinked to improve impact properties of the TPE. However, even after crosslinking, the continuous phase remains thermoplastic, thereby allowing the TPE to be re-melted for further processing. The materials taught by Laughner et al. do not have thermoset properties necessary for applications requiring high temperature resistance, and would be expected to creep, sag or melt upon exposure to temperatures experienced during operation of high temperature pipelines. Nor do the materials taught by Laughner et al. have thermoset properties required of heat-shrinkable articles, which must be heated above their melting point to effect shape recovery.

Another prior art composition is disclosed in U.S. Pat. No. 4,464,425 (Voigt et al.), issued on Aug. 7, 1994. This patent relates to foamed, rubber-like compositions produced from silane-grafted, crosslinked polymers. These compositions are disclosed as being useful in the manufacture of hoses, and would be expected to be flexible and rubber-like. These materials would not have the physical properties of a crosslinked, polypropylene-based composition.

U.S. Pat. No. 5,929,129 (Feichtinger), issued on Jul. 27, 1999, describes a process of blending a silane-grafted polyolefin with a non silane-grafted polypropylene. However, this patent is limited to the manufacture of foamed materials which do not have the physical properties of a crosslinked, polypropylene-based composition due to insufficient levels of crosslinking and blend mixture-compatibility.

SUMMARY OF THE INVENTION

The present invention overcomes the above-discussed problems of the prior art by providing predominantly polypropylene-based, moisture-crosslinked compositions and articles formed therefrom. The compositions according to the invention are comprised of a silane-modified ethylene-based polyolefin, at least 50 percent by weight of a non silane-modified polypropylene, and a silanol condensation catalyst.

Crosslinking provides the compositions of the invention with thermoset properties. The required degree of crosslinking is such that, when the composition is heated to a temperature above the crystalline melting point of the non silane-modified polypropylene, it is softened but does not become liquid.

The compositions according to the invention are suited for a wide range of applications, but are particularly well suited as coating or insulating materials, and are particularly well suited for use as sleeves for high temperature pipelines. The relatively high polypropylene content of the composition provides articles formed therefrom with a high softening or melting point, and the crosslinking provides sufficient thermoset properties to help stabilize the physical structure of the formed article at high temperatures, thereby preventing melting, sagging and creeping, and to permit the formed article to exhibit heat-shrinkability when heated above the crystalline melting point of the non silane-modified polypropylene. In other words, the compositions and articles according to the invention behave like crosslinked polypropylene compositions, which have not previously been produced due to the difficulties discussed above.

The composition according to the invention is preferably formed into a desired article by melt processing techniques such as extrusion and moulding, including multi-layer processing, for example co-extrusion of the blend with another material to form discrete but intimately bonded layers. The article thus formed is cross-linked in the presence of a silanol condensation catalyst under suitable conditions of heat and moisture, the catalyst being either blended with the composition during melt processing or added subsequently by coating the formed article, for example.

Accordingly, in one aspect, the present invention provides a crosslinked, predominantly polypropylene-based article comprising: a silane-modified ethylene-based polyolefin comprising either a silane-grafted polyolefin or a silane-olefin copolymer; at least 50 percent by weight of a non silane-modified polypropylene; and a silanol condensation catalyst; wherein the article is moisture crosslinked to a sufficient degree that it possesses thermoset properties such that, when the article is heated to a temperature above the crystalline melting point of the polypropylene, it is softened but does not become liquid.

In another aspect, the present invention provides a method for producing a crosslinked, predominantly polypropylene-based article comprising a crosslinked composition containing a silane-modified polyolefin and a non silane-modified polypropylene, said method comprising: (a) preparing said silane-modified polyolefin by reacting an ethylene-based polyolefin with a silane, said silane-modified polyolefin comprising either a silane-grafted polyolefin or a silane-olefin copolymer; (b) preparing a mixture comprising said silane-modified polyolefin, said polypropylene and a silanol condensation catalyst, said polypropylene being added in a sufficient amount that the article comprises at least 50 percent by weight polypropylene; (c) forming the article by melt processing the mixture prepared in step (b); and (d) crosslinking the article by exposing it to moisture at elevated temperature, wherein said crosslinking provides said article with thermoset properties such that, when the article is heated to a temperature above the crystalline melting point of the polypropylene, it is softened but does not become liquid.

DETAILED DESCRIPTION OF PREFERRED EMBODIMENTS

As mentioned above, the composition according to the invention is comprised of a silane-modified ethylene-based polyolefin, at least 50 percent by weight of a non silane-modified polypropylene, and a silanol condensation catalyst.

Suitable non silane-modified polypropylenes for use in the composition of the invention are selected from the group comprising polypropylene homopolymers and copolymers of polypropylene with an olefin other than propylene. The non silane-modified polypropylene is preferably isotactic in nature, and preferably has a melt viscosity similar to that of the silane-grafted ethylene-based polyolefin, thereby ensuring maximum process compatibility.

The composition according to the invention is predominantly polypropylene-based, meaning that it comprises at least 50 percent by weight of the non silane-modified polypropylene, preferably with at least 50 percent of the monomer units in the composition being propylene monomer units.

More preferably, the composition comprises from about 50 percent to about 90 percent by weight, and even more preferably from about 60 to about 90 percent, of the non silane-modified polypropylene. Furthermore, where the non silane-modified polypropylene is a copolymer comprising propylene monomer units and units of some other monomer, the propylene monomer units preferably account for at least 50 percent of the total number of monomer units in the copolymer. More preferably, the propylene monomer units preferably account for at least 75 percent, and even more preferably 85 percent, of the total monomer.

In order to ensure that the composition according to the invention has a sufficiently high softening temperature, it is preferred that the melting point of the non silane-modified polypropylene, as measured by DSC, be at least about 145° C. and more preferably at least about 150° C., it being understood that the maximum melting point of polypropylene homopolymer is about 165° C. It is also preferred that the non silane-modified polypropylene has a melting point, as measured by DSC, of at least about 20° C. above the operating temperature of the article into which the composition is formed, which is usually in the range of from about 120° C. to about 130° C.

The silane-modified ethylene-based polyolefin comprises either a silane-grafted polyolefin or a silane-olefin copolymer. The process of chemically grafting silane molecules onto a polymer to form a silane-grafted resin, followed by catalysed hydrolysis and condensation of the silane, is a well known and established process, and is described in above-mentioned U.S. Pat. No. 3,646,155, which is incorporated herein by reference in its entirety. Preparation of silane-olefin copolymers is described in above-mentioned U.S. Pat. No. 4,413,066, which is also incorporated herein by reference in its entirety.

Suitable ethylene-based polyolefins for use in the composition of the invention are selected from the group comprising polyethylene homopolymers and copolymers of ethylene with an olefin other than ethylene having from 3 to 20 carbon atoms.

Preferred polyethylene homopolymers are selected from the group comprising low density polyethylene, high density polyethylene and linear low density polyethylene, with high-density polyethylene and linear low-density polyethylene being most preferred.

Preferred copolymers of ethylene are selected from those in which the olefin other than ethylene is selected from the group comprising propylene, butene, hexene, octene, ethylidene norbornene, vinyl acetate, methyl acrylate, ethyl acrylate and butyl acrylate. The copoylmer of ethylene may also comprise an ethylene-propylene or ethylene-propylene-diene elastomer. The copolymers of ethylene are preferably prepared using so-called metallocene catalysts. In a particularly preferred embodiment of the invention, the ethylene-based polyolefin comprises an ethylene-octene copolymer polymerised using a so-called metallocene catalyst.

The ethylene-based polyolefin preferably comprises from about 50 to about 100% by weight ethylene, more preferably from about 60 to about 90% by weight ethylene, and most preferably from about 80 to about 95% by weight ethylene. The density of the polyethylene or the ethylene co-polymer is preferably in the range of about 0.85 to about 0.95 g/cm$^3$.

The silane-modified ethylene-based polyolefin is prepared by reacting the ethylene-based polyolefin in the molten state with an organic silane having the general formula RR'SiY$_2$. R represents a monovalent olefinically unsaturated hydrocarbon or hydrocarbonoxy radical, Y represents a hydrolysable organic radical and R' represents a monovalent olefinically unsaturated hydrocarbon or hydrocarbonoxy radical, or a hydrolysable organic radical.

The monovalent olefinically unsaturated hydrocarbon or hydrocarbonoxy radical is preferably selected from the group comprising vinyl, allyl, butenyl, cyclohexenyl, cyclopentadienyl, or cyclohexadienyl radicals.

The hydrolysable organic radical is preferably selected from the group comprising: alkoxy radicals such as methoxy, ethoxy and butoxy radicals; acyloxy radicals such as formyloxy, acetoxy and propionoxy radicals; oximo radicals such as —ON=C(CH$_3$)$_2$, —ON=CCH$_3$C$_2$H$_5$ and —ON=C(C$_6$H$_5$)$_2$; and substituted amino radical selected from alkylamino and arylamino radicals such as —NHCH$_3$, —NHC$_2$H$_5$ and —NH(C$_6$H$_5$)$_2$.

More preferably, the organic silane has the general formula RSiY$_3$, with the most preferred group R being the vinyl radical, and the most preferred Y group being the methoxy and ethoxy radical. Accordingly, the most preferred organic silanes for use in the present invention are vinyltriethoxysilane and vinyltrimethoxysilane.

The amount of silane reacted with the polyolefin depends in part upon the reaction conditions and the degree of modification desired in the polyolefin. The proportion may vary from about 0.1 to about 50% by weight based on the total weight of the silane-grafted resin, more preferably from about 0.5 to 10% by weight, and most preferably from about 1.0 to 2.5% by weight.

A free-radical initiator is also incorporated into the polyolefin to initiate the graft polymerization reaction. The free radical initiator is preferably an organic peroxide selected from the group comprising benzoyl peroxide, dichlorobenzoyl peroxide, dicumyl peroxide and di-tertiary butyl peroxide, with dicumyl peroxide being most preferred. The criteria for choosing an appropriate free-radical initiator are known to persons skilled in the art and are described in the above-mentioned U.S. Pat. No. 3,646,155 and will not be repeated here.

Preferably, the organic peroxide free-radical initiator is added in an amount of from about 0.1 to about 1.0% by weight of the silane-grafted resin, more preferably from about 0.05 to 0.2% by weight.

Silane-grafted polyolefins according to the invention are prepared by reacting the silane and peroxide with the ethylene-based polyolefin above the melting point of the polyolefin under conditions in which the polyolefin is subjected to mechanical working, using processes known to those skilled in the art. Silane-olefin copolymers according to the invention are prepared by reacting an unsaturated ethylene-based olefinic monomer with an unsaturated silane monomer containing one or more hydrolysable groups, preferably an organic silane as described above, such as vinyltrimethoxy silane.

The silane-modified ethylene-based polyolefin is subsequently melt-processed with the non silane-modified polypropylene, the silanol condensation catalyst, and one or more optional ingredients selected from the group comprising pigmenting agents, mineral fillers, flame-retardant additives, antioxidants, UV stabilisers, lubricants and compatibilisers.

The silanol condensation catalyst is preferably selected from the group comprising organic bases, carboxylic acids and organometallic compounds including organic titanates and complexes or carboxylates of lead, cobalt, iron, nickel, zinc and tin. More preferably, the catalyst is selected from the group comprising dibutyltin dilaurate, dibutyltin diacetate, dibutyltin octanoate, dioctyltin maleate, dibutyltin oxide and titanium compounds such as titanium-2-ethylhexoxide. The most preferred silanol condensation catalyst is dibutyltin dilaurate, though any material which will catalyse the silane condensation reaction is suitable for the invention. The condensation catalyst is preferably added in an amount of from about 0.01 to about 1 percent by weight of the coating material, more preferably about 0.05 to about 0.5 percent by weight, and most preferably about 0.1 to 0.2 percent by weight.

The optional compatibiliser may be selected from any of the ethylene-based polyolefins and polypropylenes described above. Preferred compatibilisers are selected from the group comprising ethylene-propylene copolymers; ethylene-propylene diene elastomers; polyolefins modified with reactive functional groups selected from the group comprising acrylic acids, methacrylic acids, acrylates, methacrylates and anhydrides; and block copolymers selected from the group comprising styrene-butadiene, styrene-butadiene-styrene, styrene-ethylene/propylene and styrene-ethylene/butylene-styrene.

Where a compatibilising agent is added to the composition of the invention, it is preferably added in an amount from about 1 to about 25 percent by weight, and such that the composition remains predominantly polypropylene-based.

Subjecting the composition produced by combining the ethylene-based polyolefin, the non silane-modified polypropylene and the silanol condensation catalyst to moisture, preferably at an elevated temperature, will induce crosslinking of the silane groups via a combined hydrolysis and condensation reaction. Atmospheric moisture is usually sufficient to permit the crosslinking to occur, but the rate of crosslinking may be increased by the use of an artificially moistened atmosphere, or by immersion in liquid water. Also, subjecting the composition to combined heat and moisture will accelerate the crosslinking reaction. Most preferably, crosslinking is effected at a temperature above 50° C. and most preferably by exposing the composition to a temperature of 85° C. and a relative humidity of 90% for approximately 100 hours.

A particularly preferred process for forming a crosslinked, predominantly polypropylene-based composition and article according to the invention will now be described below.

The ethylene-based polyolefin, silane, peroxide free-radical initiator and optional processing stabiliser are pre-blended and passed through an extruder at a temperature above the melting point of the polyolefin and above the decomposition temperature of the peroxide, in order to accomplish grafting of the silane onto the polyolefin. The grafted material is then passed through a multi-strand dye into a trough of cooled water, subsequently chopped into pellets with a strand pelletizer, and dried.

The grafted polymer pellets are then blended with the non silane-modified polypropylene, the silane condensation catalyst, an antioxidant stabiliser, as well as any of the optional ingredients described above. The amount of the non silane-modified polypropylene is sufficient to ensure that the final composition will be predominantly polypropylene-based. The mixture is melt processed and shaped to form an article, for example by extrusion, co-extrusion or moulding.

The shaped article is then exposed to moisture, preferably at an elevated temperature, to effect crosslinking of the composition. Shaped articles formed from the crosslinked, predominantly polypropylene-based composition, as well as the composition itself, exhibit the property of softening but not becoming liquid when re-heated above the crystalline melting point of the non silane-modified polypropylene. Thus, the composition according to the invention, as well as articles formed from the composition, exhibit thermoset properties.

The thermoset properties of the composition according to the invention make it desirable for the manufacture of heat-shrinkable articles, since the article, when softened by heating, may be stretched beyond its original extruded or moulded dimensions without rupture using relatively low forces, and can then be "frozen" in its stretched state by cooling it rapidly to below the crystalline melting point. Stretching can be accomplished by mechanical, pneumatic or hydraulic means. After cooling, the stretched crosslinks are held in a stable state by the re-formed, solid crystalline regions. Subsequent re-heating of the stretched article above the melting point will cause the crystalline regions to re-melt and the structure to revert to its original extruded or moulded dimensions. The crosslinking also prevents the article from becoming liquid during this shrinking process.

The invention is further illustrated by the following Examples:

EXAMPLE 1

A metallocene-catalysed, ethylene octene copolymer with copolymer content 14 percent, density 0.902, and melt index 4.3, was grafted with about 2% vinyl triethoxysilane according to the general procedure described above and known to those skilled in the art.

EXAMPLE 2

This example describes the production of a crosslinked, extruded sheet according to the present invention.

The grafted pellets produced according to Example 1 were blended with the ingredients indicated in Table 1, namely polypropylene, antioxidant and dibutyltin dilaurate as the condensation catalyst in the ratios indicated. The combined ingredients were fed at a melt temperature of approximately 180° C. through a 24:1 L/D single screw extruder equipped with a single layer sheet die. The extruded sheet was fixed to the required dimensions of width and thickness by passing it through a cooled, 3-roll calendering stack, then wound onto reels.

The sheet was crosslinked by conditioning the reeled sheet at a temperature of 85° C. and a relative humidity of 90% for approximately 100 hours. This crosslinked sheet was then tested to determine the degree of crosslinking and for mechanical properties as indicated in Table 2.

TABLE 1

Moisture-Crosslinkable, Polypropylene Material

| Ingredient | Addition Level | |
|---|---|---|
| Silane-Grafted Polyolefin | 40 | 30 |
| Polypropylene* | 60 | 70 |
| Antioxidant** | 2 | 2 |
| Dibutyltin Dilaurate*** | 2 | 2 |

*Density 0.89 g/cm³ and melt flow rate 4.0
**Blend of hindered phenol and phosphite stabiliser
***Added as a 2% masterbatch in polyethylene

TABLE 2

Test Results For Crosslinked Sheet

| Property | Value | |
|---|---|---|
| Gel Fraction (% degree of crosslinking) | 40 | 32 |
| Hot Tensile Strength @ 200 C. and 100% Elongation (psi) | 11.3 | 14 |
| Ultimate Hot Elongation @ 200 C. (%) | 450 | 200 |
| Ultimate Tensile Strength @ 23 C. (psi) | 4500 | 6500 |
| Ultimate Elongation @ 23 C. (%) | 620 | 660 |
| Flexural Modulus (psi) | 55000 | 58000 |

EXAMPLE 3

This example describes the production of a heat-shrinkable, extruded sheet product according to the present invention.

The crosslinked sheet prepared in Example 2 was re-heated to above the softening point and mechanically stretched in the longitudinal direction on an apparatus designed specifically for this purpose. The stretched sheet was mechanically tested for suitability as a heat-shrink coating for high-temperature pipeline joints to specifications common to the industry.

EXAMPLE 4

In another example, a 2% silane-grafted, linear low density polyethylene (LLDPE), of density 0.922 and melt index 1.0, was blended with the polypropylene and dibutyltin dilaurate catalyst from Example 2, with and without the addition of a compatibiliser, as shown in Table 3.

Crosslinked sheet was prepared as described in Example 2 and tested for the properties indicated in Table 4.

TABLE 3

Moisture Crosslinkable Polypropylene With And Without Compatibiliser

| | Addition Level | |
|---|---|---|
| Ingredient | Without Compatibiliser | With Compatibiliser |
| Silane-Grafted LLDPE | 40 | 40 |
| Polypropylene | 60 | 60 |
| Dibutyltin Dilaurate | 1.5 | 1.5 |
| Compatibiliser* | — | 5 |

*Polyethylene grafted with 0.33% maleic anhydride - density 0.93 g/cm³, melt index 2.5.

TABLE 4

Test Results For Crosslinked Sheet

| | Value | |
|---|---|---|
| Property | Without Compatibiliser | With Compatibiliser |
| Gel Fraction (% degree of crosslinking) | 30 | 30 |
| Hot Tensile Strength @ 200 C. and 100% Elongation (psi) | 11 | 7.2 |
| Ultimate Hot Elongation @ 200 C. (%) | 290 | 290 |
| Ultimate Tensile Strength @ 23 C. (psi) | 2900 | 3100 |
| Ultimate Elongation @ 23 C. (%) | 400 | 480 |

The sample with compatibiliser exhibits superior room temperature tensile strength and elongation, typical of a more homogeneous blend.

EXAMPLE 5

In a further example, a 2% silane-grafted, high density polyethylene (HDPE), of density 0.960 and melt index 2.0, was blended with the polypropylene, antioxidant and dibutyltin dilaurate catalyst from Example 2 and an additional compatibiliser, as shown in Table 5.

Crosslinked sheet was prepared as described in Example 2 and tested for the properties indicated in Table 6.

TABLE 5

Moisture-Crosslinkable, Polypropylene Material

| Ingredient | Addition Level |
|---|---|
| Silane-Grafted HDPE | 25 |
| Polypropylene | 70 |
| Antioxidant | 2 |
| Dibutyltin Dilaurate | 2 |
| Compatibiliser* | 5 |

*Styrene ethylene butadiene styrene (SEBS) block copolymer, density 0.90, Brookfield viscosity 4,200 cps.

TABLE 6

Test Results for Crosslinked Sheet

| Property | Value |
|---|---|
| Gel Fraction (% degree of crosslinking) | 17 |
| Hot Tensile Strength @ 200° C. and 100% Elongation (psi) | 8 |
| Ultimate Hot Elongation @ 200° C. (%) | 140 |
| Ultimate Tensile Strength @ 23° C. (psi) | 5100 |
| Ultimate Elongation @ 23° C. (%) | 710 |
| Flexural Modulus (psi) | 49000 |

EXAMPLE 6

In yet a further example, a 2% silane-grafted 75:25 blend of the HDPE and SEBS block copolymer in Example 5 was blended with the polypropylene, antioxidant and dibutyltin dilaurate catalyst from Example 2, as shown in Table 7.

Crosslinked sheet was prepared as described in Example 2 and tested for the properties indicated in Table 8.

TABLE 7

Moisture-Crosslinkable, Polypropylene Material

| Ingredient | Addition Level |
|---|---|
| Silane-Grafted HDPE/SEBS Blend | 30 |
| Polypropylene | 70 |
| Antioxidant | 2 |
| Dibutyltin Dilaurate | 2 |

TABLE 8

Test Results for Crosslinked Sheet

| Property | Value |
|---|---|
| Gel Fraction (% degree of crosslinking) | 21 |
| Hot Tensile Strength @ 200° C. and 100% Elongation (psi) | 13 |
| Ultimate Hot Elongation @ 200° C. (%) | 140 |
| Ultimate Tensile Strength @ 23° C. (psi) | 5100 |
| Ultimate Elongation @ 23° C. (%) | 710 |

TABLE 8-continued

Test Results for Crosslinked Sheet

| Property | Value |
|---|---|
| Flexural Modulus (psi) | 47000 |

Preferably, compositions according to the invention have a gel fraction greater than about 20 percent, more preferably greater than about 30 percent, and even more preferably greater than about 35 percent.

Although the invention has been described in relation to certain preferred embodiments, it will be appreciated that it is not intended to be limited thereto. Rather, the invention is intended to encompass all embodiments which fall within the scope of the following claims.

What is claimed is:

1. A crosslinked, predominantly polypropylene-based article comprising:
   (a) a silane-modified ethylene-based polyolefin comprising either a silane-grafted polyolefin or a silane-olefin copolymer;
   (b) at least 50 percent by weight of a non silane-modified polypropylene; and
   (c) a silanol condensation catalyst;
   wherein the article is moisture crosslinked to a sufficient degree that it possesses thermoset properties such that, when the article is heated to a temperature above the crystalline melting point of the non silane-modified polypropylene, it is softened but does not become liquid.

2. The crosslinked, predominantly polypropylene-based article according to claim 1, wherein the non silane-modified polypropylene has a melting point, as measured by differential scanning calorimetry, of from about 145° C. to about 165° C.

3. The crosslinked, predominantly polypropylene-based article according to claim 1, wherein the non silane-modified polypropylene has a melting point, as measured by differential scanning calorimetry, of from about 150° C. to about 165° C.

4. The crosslinked, predominantly polypropylene-based article according to claim 1, wherein at least 50 percent of monomer units in the article are propylene monomer units.

5. The crosslinked, predominantly polypropylene-based article according to claim 1, wherein at least 50 percent of monomer units in the non silane-modified polypropylene are propylene monomer units.

6. The crosslinked, predominantly polypropylene-based article according to claim 1, wherein at least 75 percent of monomer units in the non silane-modified polypropylene are propylene monomer units.

7. The crosslinked, predominantly polypropylene-based article according to claim 1, wherein the non silane-modified polypropylene has a melting point, as measured by differential scanning calorimetry, at least 20° C. greater than an operating temperature of the article.

8. The crosslinked, predominantly polypropylene-based article according to claim 1, said article being heat shrinkable.

9. The crosslinked, predominantly polypropylene-based article according to claim 1, wherein the ethylene-based polyolefin subjected to silane modification is selected from the group comprising polyethylene and copolymers of ethylene with an olefin other than ethylene having from 3 to 20 carbon atoms.

10. The crosslinked, predominantly polypropylene-based article according to claim 9, wherein said olefin other than ethylene comprises one or more members of the group comprising propylene, butene, hexene, octene, ethylidene norbornene, vinyl acetate, methyl acrylate, ethyl acrylate and butyl acrylate.

11. The crosslinked, predominantly polypropylene-based article according to claim 1, wherein the non silane-modified polypropylene is selected from the group comprised of polypropylene homopolymers and of copolymers of predominantly propylene with an olefin other than propylene.

12. The crosslinked, predominantly polypropylene-based article according to claim 1, wherein the silane modified ethylene-based polyolefin comprises an ethylene-based polyolefin which has been reacted with a silane of the general formula $RR'SiY_2$ wherein R represents a monovalent olefinically unsaturated hydrocarbon or hydrocarbonoxy radical, Y represents a hydrolysable organic radical and R' represents a monovalent olefinically unsaturated hydrocarbon or hydrocarbonoxy radical, or a hydrolysable organic radical.

13. The crosslinked, predominantly polypropylene-based article according to claim 12, wherein the monovalent olefinically unsaturated hydrocarbon or hydrocarbonoxy radical is selected from the group comprising vinyl, allyl, butenyl, cyclohexenyl, cyclopentadienyl, and cyclohexadienyl.

14. The crosslinked, predominantly polypropylene-based article according to claim 12, wherein Y represents a hydrolysable organic radical selected from the group comprising methoxy, ethoxy, butoxy, formyloxy, acetoxy, propionoxy; oximo radicals selected from the group comprising $-ON=C(CH_3)_2$, $-ON=CCH_3C_2H_5$ and $-ON=C(C_6H_5)_2$; and substituted amino radicals selected from the group comprising alkylamino and arylamino radicals.

15. The crosslinked, predominantly polypropylene-based article according to claim 14, wherein said alkylamino radicals and arylamino radicals are selected from the group comprising $-NHCH_3$, $-NHC_2H_5$ and $-NH(C_6H_5)_2$.

16. The crosslinked, predominantly polypropylene-based article according to claim 12, wherein the silane has general formula $RSiY_3$, with R being vinyl and Y being methoxy or ethoxy.

17. The crosslinked, predominantly polypropylene-based article according to claim 1, wherein the amount of the silane reacted with the ethylene-based polyolefin is from 1.0 to 2.5 percent by weight of the silane-modified polyolefin.

18. The crosslinked, predominantly polypropylene-based article according to claim 1, comprising the non silane-modified polypropylene in an amount of from 50 to 90 percent by weight.

19. The crosslinked, predominantly polypropylene-based article according to claim 1, wherein the silanol condensation catalyst is selected from the group comprising dibutyltin dilaurate and dibutyltin oxide.

20. The crosslinked, predominantly polypropylene-based article according to claim 1, comprising the silanol condensation catalyst in an amount of from 0.05 to 0.2 percent by weight.

21. The crosslinked, predominantly polypropylene-based article according to claim 1, further comprising additional ingredients selected from the group comprising antioxidants, fillers, colorants, UV stabilizers and lubricants.

22. The crosslinked, predominantly polypropylene-based article according to claim 1, further comprising one or more compatibilisers.

23. The crosslinked, predominantly polypropylene-based article according to claim 22, wherein the compatibiliser is selected from the group comprising polypropylenes; ethylene-based polyolefins; ethylene-propylene copolymers; ethylene-propylene diene elastomers; polyolefins modified with reactive functional groups selected from the group comprising acrylic acids, methacrylic acids, acrylates, methacrylates and anhydrides; and block copolymers selected from the group comprising styrene-butadiene, styrene-butadiene-styrene, styrene-ethylene/propylene and styrene-ethylene/butylene-styrene.

24. The crosslinked, predominantly polypropylene-based article according to claim 23, comprising the compatibiliser in an amount of from 1 to 25 percent by weight.

25. The crosslinked, predominantly polypropylene-based article according to claim 1, wherein said crosslinking is sufficient to provide the article with a gel fraction of greater than 20 percent.

26. The crosslinked, predominantly polypropylene-based article according to claim 25, wherein the gel fraction is greater than 30 percent.

27. The crosslinked, predominantly polypropylene-based article according to claim 26, wherein the gel fraction is greater than 35 percent.

28. The crosslinked, predominantly polypropylene-based article according to claim 1, wherein the article is selected from the group comprising coating materials, insulating materials, and sheet materials.

29. The crosslinked, predominantly polypropylene-based article according to claim 28, wherein the article is a heat-shrinkable sleeve for a high-temperature transmission pipeline.

30. A method for producing a crosslinked, predominantly polypropylene-based article comprising a crosslinked composition containing a silane-modified polyolefin and a non silane-modified polypropylene, said method comprising:

(a) preparing said silane-modified polyolefin by reacting an ethylene-based polyolefin with a silane, said silane-modified polyolefin comprising either a silane-grafted polyolefin or a silane-olefin copolymer;

(b) preparing a mixture comprising said silane-modified polyolefin, said non silane-modified polypropylene and a silanol condensation catalyst, said non silane-modified polypropylene being added in a sufficient amount that the article comprises at least 50 percent by weight of the non silane-modified polypropylene;

(c) forming the article by melt processing the mixture prepared in step (b); and (d) crosslinking the article by exposing it to moisture at elevated temperature, wherein said crosslinking provides said article with thermoset properties such that, when the article is heated to a temperature above the crystalline melting point of the non silane-modified polypropylene, it is softened but does not become liquid.

31. The method according to claim 30, wherein the non silane-modified polypropylene has a melting point, as measured by differential scanning calorimetry, of from about 145° C. to about 165° C.

32. The method according to claim 30, wherein at least 50 percent of monomer units in the article are propylene monomer units.

33. The method according to claim 30, wherein at least 50 percent of monomer units in the non silane-modified polypropylene are propylene monomer units.

34. The method according to claim 30, wherein the non silane-modified polypropylene has a melting point, as measured by differential scanning calorimetry, at least 20° C. greater than an operating temperature of the article.

35. The method according to claim 30, wherein said article is heat-shrinkable and wherein said method further comprises:

(e) softening the article crosslinked in step (d) by application of heat thereto, stretching said heated article and then freezing said material in its stretched form.

36. The method according to claim 30, wherein said crosslinking is sufficient to provide the article with a gel fraction of greater than 20 percent.

37. The method according to claim 30, wherein the ethylene-based polyolefin is selected from the group comprising polyethylene and copolymers of ethylene with an olefin other than ethylene having from 3 to 20 carbon atoms.

38. The method according to claim 37, wherein said olefin other than ethylene comprises one or more members of the group comprising propylene, butylene, hexene, octene, ethylidene norbornene, vinyl acetate, methyl acrylate, ethyl acrylate and butyl acrylate.

39. The method according to claim 30, wherein the non silane-modified polypropylene is selected from the group comprising polypropylene homopolymers and copolymers of predominantly propylene with an olefin other than propylene.

40. The method according to claim 30, wherein the silane has the general formula $RR'SiY_2$ wherein R represents a monovalent olefinically unsaturated hydrocarbon or hydrocarbonoxy radical, Y represents a hydrolysable organic radical and R' represents a monovalent olefinically unsaturated hydrocarbon or hydrocarbonoxy radical, or a hydrolysable organic radical.

41. The method according to claim 40, wherein the silane has general formula $RSiY_3$, with R being vinyl and Y being methoxy or ethoxy.

42. The method according to claim 30, wherein the amount of the silane reacted with the ethylene-based polyolefin is from 1.0 to 2.5 percent by weight of the silane-modified polyolefin.

43. The method according to claim 30, wherein the non silane-modified polypropylene is added to the mixture of step (b) in an amount of from 50 to 90 percent by weight of the mixture.

44. The method according to claim 30, wherein the silanol condensation catalyst is selected from the group comprising dibutyltin dilaurate and dibutyltin oxide.

45. The method according to claim 30, wherein the silanol condensation catalyst is added to the mixture of step (b) in an amount of 0.05 to 0.2 percent by weight of the mixture.

46. The method according to claim 30, wherein said mixture prepared in step (b) further comprises optional additional ingredients selected from the group comprising antioxidants, fillers, colorants, UV stabilizers and lubricants.

47. The method according to claim 30, wherein said mixture prepared in step (b) further comprises one or more compatibilizers selected from the group comprising polypropylenes; ethylene-based polyolefins; ethylene-propylene copolymers; ethylene-propylene diene elastomers; polyolefins modified with reactive functional groups selected from the group comprising acrylic acids, methacrylic acids, acrylates, methacrylates and anhydrides; and block copolymers selected from the group comprising styrene-butadiene, styrene-butadiene-styrene, styrene-ethylene/propylene and styrene-ethylene/butylene-styrene.

48. The method according to claim 47, wherein the compatibiliser is added to the mixture of step (b) in an amount of from 1 to 25 percent by weight of the mixture.

* * * * *